United States Patent Office 3,798,198
Patented Mar. 19, 1974

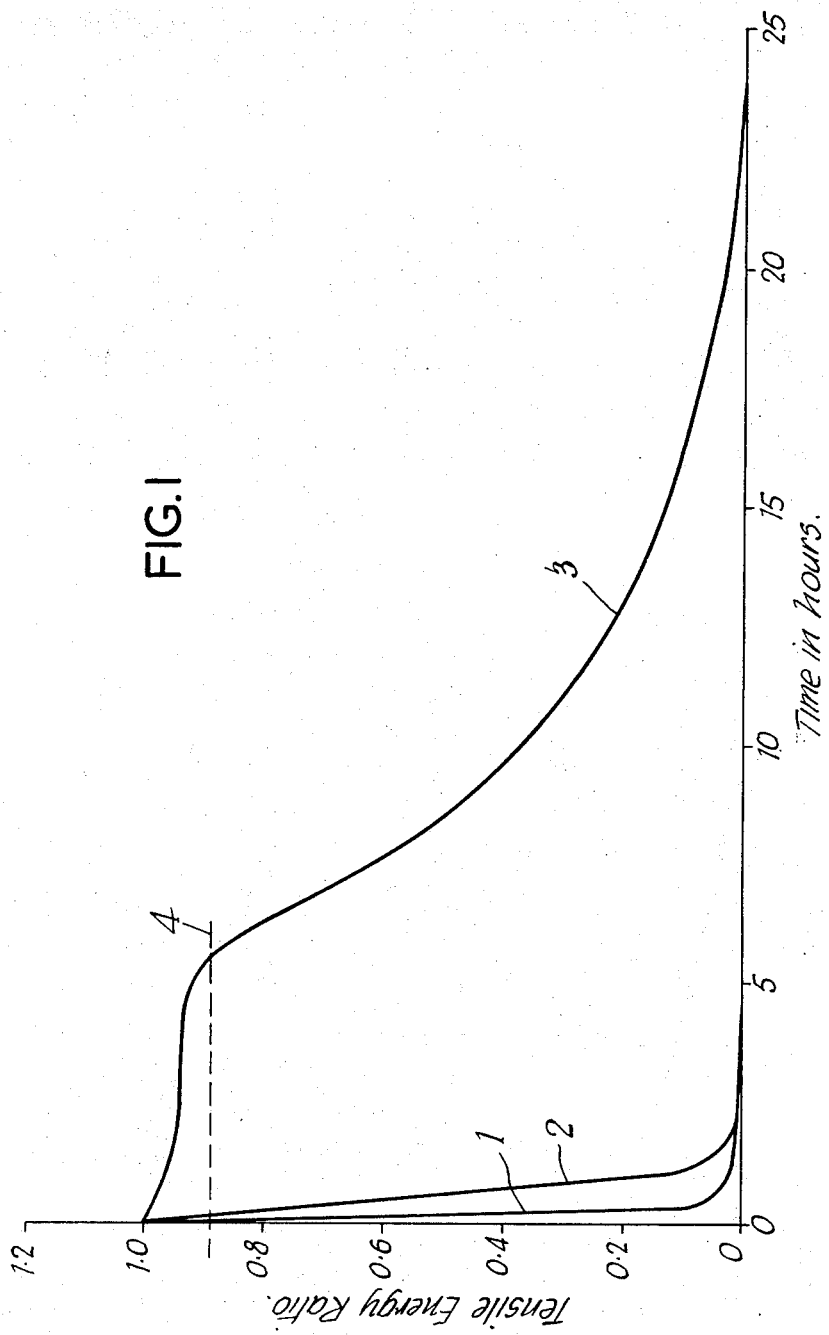

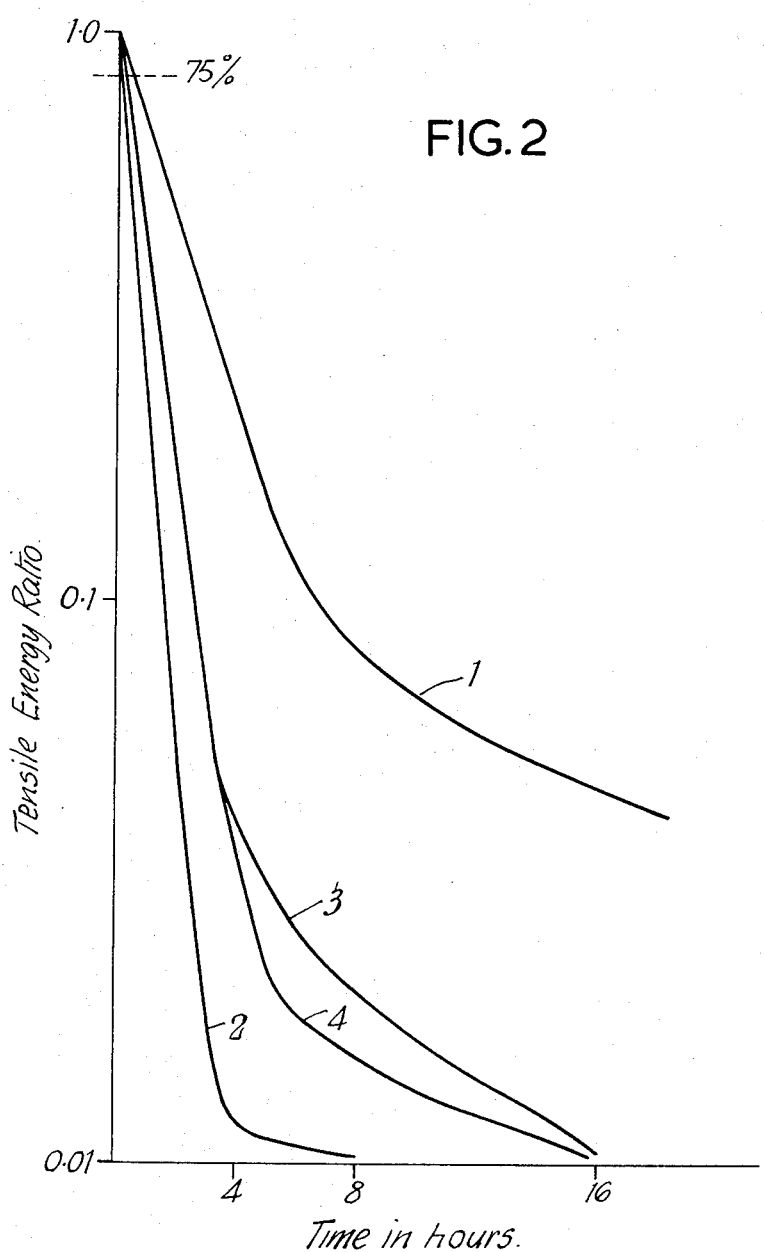

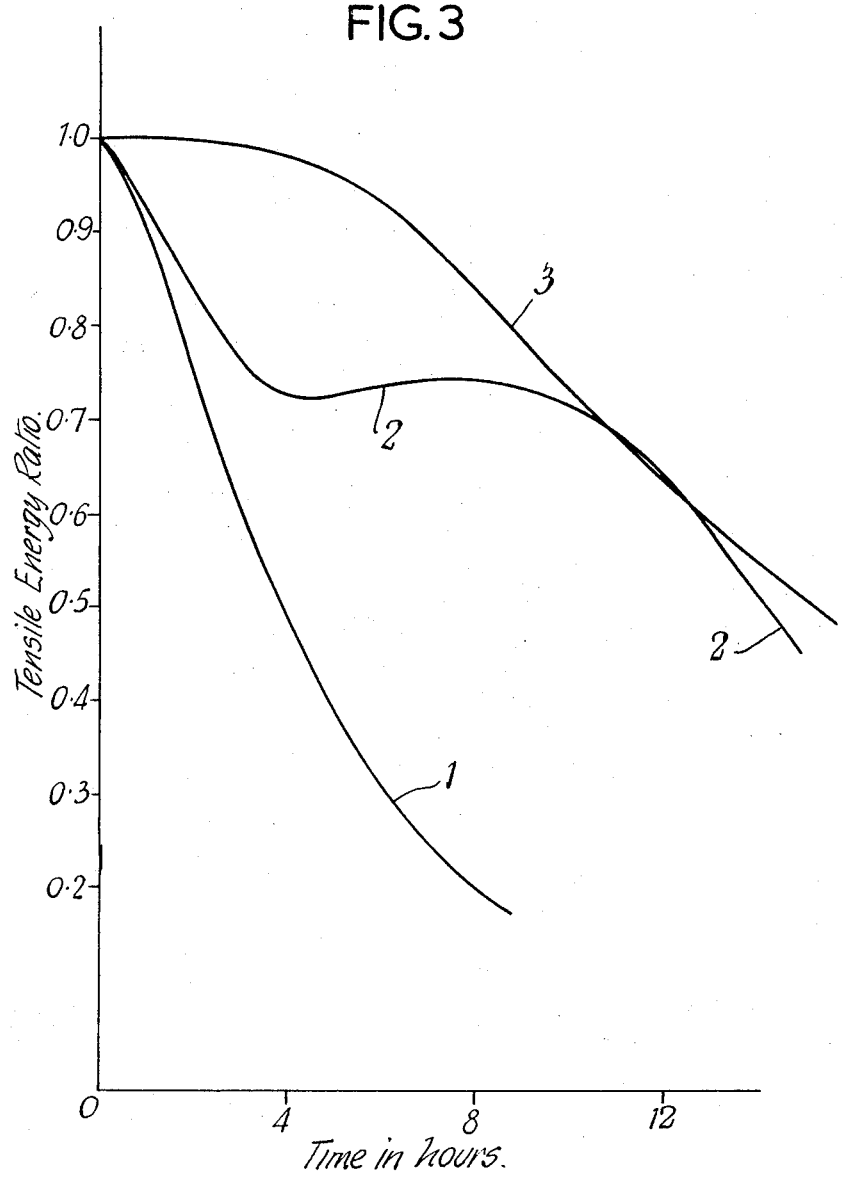

3,798,198
HYDROLYTICALLY STABILIZED POLYURETHANES
Lionel Geoffrey Hole, Barton Seagrave, England, assignor to The Shoe and Allied Trades Research Association, Kettering, England
Filed Dec. 18, 1970, Ser. No. 99,626
Claims priority, application Great Britain, Dec. 19, 1969, 62,094/69; Apr. 10, 1970, 17,228/70
Int. Cl. C08g 51/58, 51/60, 51/62
U.S. Cl. 260—45.85 R       17 Claims

ABSTRACT OF THE DISCLOSURE

Products partly or wholly composed of polymeric condensates, especially polyurethane, and stabilized against hydrolytic degradation by the incorporation of a minor amount, not less than ½%, of a stabilizer selected from chelating agents, weak free organic acids and buffer salts. A preferred stabilizer is ethylene diamine tetraacetic acid (EDTA) or a soluble salt thereof, e.g. the disodium salt. The stabilization is particularly effective when the product incorporates inorganic cations such as residual catalyst. A process in which the stabilizer is added to a solution of the polymeric condensate which is subsequently formed by solvent removal into a product.

INTRODUCTION

The presenat invention relates to the stabilization of polymeric products particularly against hydrolytic attack as will be hereinafter explained. It relates particularly to polymeric condensates especially polyurethanes and more especially polyester urethanes for the manufacture of shoes, particularly shoe uppers. However, the invention is effective with polyamides and polyesters.

SUMMARY OF THE PRIOR ART

Research into the stabilization of polymers has continued throughout the history of the evolution of plastics materials. Thus, nearly all plastics materials contain antioxidants which assist in the retention of the desired color. A lot of research has also been undertaken into reducing as far as possible degradation by ultra-violet energy from sunlight. Another form of degradation which has led to research is that caused by heating of the plastics materials to elevated temperatures. For example an early British patent specification No. 677,505 describes the incorporation of ethylene diamine tetraacetic acid (EDTA) into polymeric vinylidene chloride to protect the resulting product from darkening and further thermal decomposition upon exposure to elevated temperatures. U.S. patent specification 2,945,000 describes the incorporation of alkyl gallates into linear polyesters of high molecular weight for the same purpose. Swiss Pat. 467,828 describes the incorporation of organic carboxylic anhydrides such as acetic anhydride into polyurethane compositions for the preparation of elastomers, together with anti-oxidants, for the purpose of reducing degradation by ultraviolet light.

Only more recently has attention been directed to degradation due to hydrolysis. This has resulted from the increased use of polymeric products of the condensate type which rely to a considerable extent for their properties upon hydrogen bonding between the polymer chains, and in particular their increased use for a number of purposes which increase their liability to this form of attack. For example French specification 1,550,562 and British specification 1,014,974 deal with the stabilization of polyurethane against hydrolytic attack. Most recently, polyurethanes have begun to be used in the manufacture of footwear and this use, which started with the replacement of PVC by polyurethane in the injection moulding of soles, is now advancing extremely rapidly with the development of the so-called "poromeric" materials from which shoe uppers are now being manufactured. Most present poromerics are made of polyurethane, including polyester and polyether urethanes. Examples are those sold under the trademarks "Corfam," "Clarino," and "Porvair." Porvair is a wholly thermoplastic polyurethane based microcellular material, but normally contains a pigmented outer layer with a simulated grain pattern. The other poromeric materials are in general fibre-reinforced and more clearly multilayer structures. These may involve comparatively thin layers of polyurethane over a polyamide or polyester fibre reinforcement. Due to their porous nature they are highly susceptible to attack through the agency of liquids and moist vapors and due to the cellular structure and the thinness of some of the layers, hydrolytic attack can be very rapid.

Quite apart from the susceptability of poromerics themselves, it is probably true to say that of all the possible uses of plastics materials, shoes are the most susceptible to hydrolytic attack since the shoe material is in constant contact with moist conditions, either externally from rain or contaminated conditions in factories and lavatories or internally from sweat. Thus, it can reasonably be said that where shoes are concerned, degradation due to hydrolysis may be far more important and dramatic than degradation due to any of the other causes explained above which may never have a chance to take effect.

The degradation of footwear due to hydrolysis and in particular poromeric shoe uppers, has been the subject of an extensive survey by the present inventor, the results of which are set out in SATRA Research Report RR 203 published by the Shoe and Allied Trades Research Association in June 1969. Experiments were made to simulate in the laboratory the type of degradation found to be occurring in shoe uppers which appeared to be due to hydrolytic attack and it was found in particular that this form of degradation could be substantially speeded up by treating the product to be tested in an autoclave at 120° C. (15 p.s.i.). For the purposes of the present specification, in order to distinguish the type of degradation being considered from other types of degradation which may occur simultaneously in actual use, hydrolytic attack will be specified as the form of attack which may be proproduced by this treatment.

SUMMARY OF THE INVENTION

The invention is based upon the discovery that hydrolytic degradation as above explained can be substantially reduced or slowed down by the incorporation in a product partly or wholly composed of a polymeric condensate of a minor amount of a stabilizer selected from chelating agents, weak free organic acids and buffer salts. It has been found that the hydrolytic degradation is most sharp and at the same time most common under alkaline pH conditions and it is presumed that the buffers and weak organic acids correct the tendency to degradation by maintaining the pH environment normal or slightly to the acid side of normal. Many chelating agents also have a buffering effect, notably the disodium salt of EDTA which is an additional reason for preferring this material. However it is believed that the chelating agents act particularly by complexing with inorganic cations which may be present in the polymeric product, either initially or as a result of use, and which have a remarkable catalytic effect upon the hydrolytic degradation. Thus, an important part of the inventor's work has been concerned with the effect of inorganic cations and salts, in particular those of heavy metals in the degradation process and with the correction of this effect. The effect of these impurities is dealt with to a large extent in the above mentioned SATRA Research Report. However, more recent work has brought to light some important ancilliary effects of impurities. In particular it has been found that pure polyurethane products free from pigment or other inorganic impurities are in general much more resistant to hydrolytic attack than products containing such impurities and indeed that the presence of the stabilizer of the invention is often of little or no value in connection with such products, and indeed may be deleterious where the product is in the form of thin films or cell walls and where the presence of any solid particles may lower the strength of the product. However, such pure products are of negligible commercial value and even where used, will acquire impurities in use. Thus, for a proper understanding of this effect it is important to distinguish results obtained under laboratory conditions where there is no time available for the introduction of impurities from conditions in actual use.

An understanding of the impurity factor is important in the assessment of the present invention. Thus for example British patent specification 1,056,721 describes a method for improving the initial color of polyester urethane elastomers and for enhancing their color stability in the presence of light which method comprises reacting the polyester urethane-forming ingredients while in contact with a critically small amount of an amine acetic acid chelating agent such as EDTA. By critically small amount the authors means 0.03 to 0.4% by weight based on the weight of the polyesterurethane product. The authors further state that when greater than about 0.4% is charged the product elastomer has inferior mechanical properties and in particular a pronounced decrease in tensile strength is observed.

These results might be considered completely at variance with the findings herein set forth relating to the present invention, and it is considered that this is due to ignorance of the impurity factor as above explained. Thus, where pure products are treated under laboratory conditions various results can be produced, some of which are not inconsistent with the findings described in British patent specification 1,056,721 due to the reduction in tensile strength inherently produced by the presence of solid particles. However, where solid particles are already present e.g. in the form of pigment, completely different and surprising results are obtained. The product is inherently of lower tensile strength than the pure product and the further presence of the stabilizer makes little difference to the initial tensile strength, whereas the resistance to hydrolytic degradation (not referred to in 1,056,-721) is most marked. The most surprising and dramatic effects are produced in polymers containing residual amounts of inorganic catalyst such as stannous octoate used in the production of polyurethane and which had a marked catalytic effect upon the hydrolytic degradation. British patent specification 1,056,721 further acknowledges that certain long chain triacetic acid-substituted alkylene diamines of particular structure have been used in larger quantities to inhibit environmental stress cracking in synthetic rubbers with which, however, the present invention is not concerned.

BRIEF DESCRIPTION OF THE DRAWINGS

FIGS. 1, 2 and 3 are graphs of tensile energy ratio plotted against degradation time for different products.

DESCRIPTION OF PREFERRED EMBODIMENTS

The preferred stabilizer is EDTA in the form of the free acid or a soluble salt and in particular best uses result from the use of the disodium salt. Chelating agents are defined as compounds which form stable complexes with ions particularly of heavy or transition metal elements such as iron. The preferred chelating agents will also form complexes with tin and lead. Other suitable chelating agents are e.g. EGTA ethylene glycol bis(2-amino ethyl) tetraacetic acid; diaminoethane N,N'-di-(o-hydroxyphenylacetic acid); 1,2-diaminocyclohexanetetraacetic acid; iminodiacetic acid and thio urea. EDTA is also a weak free organic acid, other examples of which are benzoic acid, salicylic acid, phthalic acid and adipic acid. These acids which may be used in conjunction with other stabilizers or alone remove or neutralize basic substances such as ammonia which occur in sweat and urine and thus restore a more neutral pH. Some of the acids perform a double function of forming complexes with harmful metal ions, e.g. salicylic acid. Others form metal salts of low solubility e.g. benzoic acid. As buffers there may be mentioned potassium hydrogen phthalate, potassium hydrogen tartrate and sodium hydrogen succinate. These buffers are preferably buffers which will bring the pH environment towards the acid side.

The stabilizers may be added in several ways as follows:

(i) The powdered stabilizer(s) is blended with the other solid additives e.g. pigments, and mixed into a suitable solution of the polyurethane polymer prior to coating on to a supporting substrate, e.g. a poromeric or plastic coated fabric. Where no pigment is used such as in the impregnation of non-woven fabrics, e.g. poromeric materials, the stabilizer may be added alone or blended with a suitable carrier e.g. barium sulphate. Effective amounts of stabilizer are in the range 0.5% to 2%, but more or less may be added as conditions and the polyurethane polymer dictate.

(ii) In the case of cast and cross-linked solid polyurethanes the additives may be added along with pigments etc. to one or another of the polyurethane precursors, e.g. the liquid prepolymer or the liquid chain extender.

(iii) The stabilizer is blended into the polymer mix in the case of gum or millable polyurethane polymers.

(iv) In the case of microporous polyurethane sheets such as might be used for footwear, clothing, upholstery, baggage, etc. it may sometimes be convenient to pass the material through a solution or dispersion of the stabilizer. The latter is readily absorbed by the porous material and the solvent or dispersing liquid may be removed in some convenient way e.g. steam ovens.

(v) In certain situations it may be necessary to add stabilizer to the polyurethane during its service life e.g. footwear uppers. In such cases solutions or dispersions of stabilizers are periodically applied to the polymer by the used. In the case of footwear, upholstery, etc. the stabilizer can be conveniently incorporated in a suitable cleaning fluid or polish.

Treatment of experimental results

In the following examples the treatment of the experimental results was based upon the procedure set forth in the above mentioned SATRA Research Report RR 203. Degradation was measured by the effect on tensile strength although consistent results were obtained with measurements of flexural strength. In general, solutions were made from polyurethane products, normally in dimethylformamide (DMF). A fixed weight of a solution was cast on to a flat glass plate and allowed to flow over a defined area and then dried by air circulation at a tempearture of 60° C. resulting in a film of 0.025 cm. thickness. Strips were cut from the film by using a punch dye 2 mms. wide by 15 cms. long and tensile strength was recorded on an Instrom Tensometer. The distance between the jaws was 3.5 cms. and the extension rate 5 cms./minute. Hydrolytic degradation was carried out normally through the use of a pressure cooker giving steam at 15 p.s.i. i.e. 120° C. In many cases, however, other temperatures were used. All degraded strips were allowed to stand in a conditioning room at 65% relative humidity for forty-eight hours before being tested. Impurities and stabilizer were made up in DMF solution or dispersion and added to the solution before casting. The results were normally expressed in the form of tensile energy ratio as more fully treated in the said SATRA Research Report. Briefly, the stress-strain plot as obtained on the Instrom Tensometer is integrated to obtain the area under the curve which corresponds to the tensile energy. The ratio of the tensile energy after a particular treatment to the initial tensile energy (without degradation treatment) is then plotted against degradation treatment time. Where possible the treatment is repeated at different temperatures so that a master curve for a chosen mean temperature can be obtained from use of the time-temperature superposition principle (see H. Lederman "Elastic and Creep Properties of Filamentous Materials." The Textile Foundation, Washington, 1943). From the master curve, the activation energy of degradation for any particular product may be obtained by drawing an Arrhenius plot for different values of the expression $1/T°K.$, the slope of which gives the activation energy. The straight line graph can be extrapolated to give the appropriate scale factor for degradation at different lower temperatures, e.g. a temperature of 30° C. can be considered the environmental temperature for footwear. The life and rate of degradation at this temperature can therefore be predicted. It has been found that in accordance with the invention it is possible to increase the time for hydrolytic degradation (calculated at 30° C.) to 75% of the initial tensile energy by a very considerable factor. For the majority of polyurethanes tested, particularly where impurities are present, a factor of at least two can be obtained and indeed a factor of twenty-five can be obtained in most cases. However, factors of up to 30,000 have been obtained. In the case of some of the products, the time for degradation to 50% of the initial tensile energy is a more significant factor but the former factor is of more practical importance.

EXAMPLE 1

To a 30% solution of a polyurethane polymer (a conventional polyester urethane) in dimethylformamide a mixture of 3% iron oxide and ½% ethylene diamine tetraacetice acid (disodium salt) (based upon the weight of polymer) was added.

This dispersion was coated on to a suitable release surface and the material then passed through a cold water bath (mixtures of water/acetone and other solvents may be used as described in the patent literature) to produce a porous film. The residual solvents were removed in air ovens. The dry microporous polyurethane sheet when artificially degraded in water or in solutions of ammonia and urea, or in superheated steam was shown to have a very substantially improved resistance to hydrolytic degradation due to the addition of the ethylene diamine tetraacetate. This was demonstated by much better retention of tensile properties and improved resistance to flex cracking.

Similar experiments using 1,2-diaminocyclohexane tetraacetic acid as stabilizer (also benzoic acid, salicyclic acid and phthalic acid) also demonstrated a substantial improvement in resistance to degradation by hydrolysis.

EXAMPLE 2

To solution of 30% polyurethane polymer (as above) in dimethylformamide a mixture of 2½% carbon black and ½% benzoic acid (based upon the weight of polymer) was added. A microporous film was formed as described in Example 1. The addition of the benzoic acid as stabilizer was shown to confer a substantial improvement in resistance to degradation by solutions of ammonia and urea (concentrations of ammonia and urea similar to those found in human sweat were employed).

EXAMPLE 3

Similar experiments to those under 1 and 2 were carried out in which the microporous structure in the polyurethane was obtained by blending, into the polymer-pigment-stabilizer-mixture, 30% of ammonium sulphate microcrystals (sodium chloride and starch granules as well as other water-soluble materials may also be used). After coating a film of the mixture and after solvent removal, the ammonium sulphate was leached out in a hot water tank as is described in the relevant patent literature, leaving a porous polyurethane film.

Microporous films made in this way were also shown to have substantially improved resistance to hydrolysis when stabilizers of the type described in 1 and 2 were incorporated.

EXAMPLE 4

In the preparation of a rigid cast polyurethane polymer ¼% of ethylene diamine tetraacetic acid (EDTA) disodium salt was incorporated in the prepolymer polyester component of the reactants. The final cast polyurethane polymer was formed in the usual way described in text books of polyurethane chemistry e.g. a prepolymer is formed by reacting a suitable polyol e.g. polyglycol adipate, with excess of 2,4-tolylene diisocyanate. The isocyanate-ended prepolymer which results is then chain extended-crosslinked with diamine (e.g. 4,4'-methylene bis (2-chloroaniline)) extender or diol/triol (e.g. 1,4-butanediol) extender. The EDTA stabilizer may be incorporated into either of these components i.e. prepolymer or chain extender, prior to polymerization by mixing the two components.

Such a cast polyurethane polymer with the stabilizer added was found to have substantially improved resistance to deterioration in environments which are known to hydrolyze and degrade polymers of this type. Such polymers as this may be cast into wall panels, weapon components, vehicle components etc.

EXAMPLE 5

A fabric (Hi-Telac) coated with microporous polyurethane (containing an iron-containing pigment) of the poromeric type was passed through a bath containing 2% aqueous solution of the disodium salt of EDTA. The excess water was removed in a hot air oven thus leaving the poromeric material impregnated with the stabilizer. This stabilizer material showed improved resistance to deterioration by hydrolysis both when made into footwear and when subjected to laboratory test conditions designed to simulate the deterioration observed in wear. Improved resistance to flex cracking and an improved maintenance of tensile properties was observed in the stabilized material.

Similar impregnation of poromeric materials by water-insoluble stabilizers using petroleum spirit solutions (also as emulsions in water) or solutions in chlorinated solvents e.g. trichloroethylene may also be employed.

EXAMPLE 6

In some circumstances it is convenient to provide the user of the polyurethane-containing product (e.g. wearer of footwear etc.) with a solution of a stabilizer which can be applied to the polymer periodically.

To a conventional shoe-cleaning wax polish 2% of EDTA was added and thoroughly dispersed. Surface treatments of poromeric shoe materials with this cleaning compound were found to have improved resistance to accelerated hydrolysis due to moisture and sweat components e.g. ammonia/urea. Similar cleaning mixtures were made containing 2% benzoic acid, 2% salicylic acid, 2% phthalic acid. These stabilizer-containing polishes were also found to improve the resistance to hydrolysis of poromeric materials and polyurethane coated fabrics used in footwear, clothing and upholstery.

EXAMPLE 7

2% of EDTA was incorporated in a typical wax polish formulation of the dispersion-in-water type. This stabilizing polish when used to treat poromeric and polyurethane coated fabrics and leather were found to substantially improve the resistance to hydrolysis of these materials. This was shown by an improved resistance to flex cracking and improved retention of tensile properties in service.

EXAMPLE 8

2% of ethylenediamine tetraacetic acid was added to a nylon melt awaiting formation into fibres. The EDTA was thoroughly dispersed in the melt and after fibre formation the fibres were drawn in the usual way. The resulting fibres were found to have improved resistance to deterioration in moist environments and other conditions likely to cause polymer breakdown e.g. yellowing and degradation by sunlight.

EXAMPLE 9

1% of ethylenediamine tetraacetic acid was added to a polyester polymer melt awaiting formation into fibres. The stabilizer was thoroughly dispersed in the melt and the resulting fibres, made in the usual way, were found to have improved resistance to deterioration in moist environments in conditions where trace or larger amounts of catalysts may be present, also to sunlight.

EXAMPLE 10

Example 1 was repeated with a different conventional polyesterurethane without added iron oxide and using 2% by weight of the polymer of the disodium salt of EDTA. The results are shown in the form of a graph in FIG. 1 for degradation in steam at 120° C. the ordinate being the tensile energy ratio. Curve 1 shows the result obtained with no stabilizer, curve 2 shows the improvement obtainable with a carbodiimide stabilizer as for example taught in British patent specification 1,014,974 and curve 3 is that obtained with the sodium salt of EDTA. The use of carbodiimides has previously been proposed in the said British specification No. 1,014,974 and French specification 1,550,562 on the basis that they react with free carboxylic acid groups produced in the course of hydrolytic degradation ad which catalyse further degradation. These carbodiimides may be included together with the stabilizers of the present invention, in particular chelating agents. Indeed, as will be further explained, there is evidence of a synergistic effect obtainable with such a combination of stabilizers in cases where degradation is rapid due to the presence of residual catalyst or other inorganic cations.

It can be seen from FIG. 1 that the time taken for degradation to 75% of the initial tensile energy ratio (broken line 4) is greater by a factor of at least 10 where the stabilizer used is the sodium salt of EDTA and the improvement over the untreated product is much greater still.

EXAMPLE 11

The following experiment demonstrates the importance of correctly assessing the impurity factor in the benefit derived from the incorporation of the stabilizer in accordance with the invention. In this case a pure polyester urethane was synthesized and various additives were incorporated in the solution before it was cast, treated and tested for tensile strength. The preparation of the polymer was as follows. To prepare the polyester a ratio of 70:30 diols and 10 molar percent excess was used and the following were charged into a flask: 408 g. diethylene glycol, 125.4 g. propylene glycol, 730 g. adipic acid.

The calculated theoretical amount of water to be removed during condensation was 180 ml. The flask was heated to start an exothermic reaction at a temperature of 175° C. and after the exothermic reaction had subsided heating was reapplied and the temperature held at 150° C. for one hour. After this time 25 ml. xylene were added and a water trap and the reaction was continued for a total reaction time of 16¼ hours.

The resulting product had an estimated molecular weight of 2,000, a hydroxyl value of 70 and an acid value of 4.

To prepare a prepolymer 50 gms. of the resin were reacted with 25 g. of MDI in a flask for 10 minutes at 65° C., the MDI being first melted at 50° C. and added at that temperature. To this prepolymer 5 g. of butane diol were added plus 30 ml. DMF, stirring was continued for half an hour during which time the viscosity increased and then a further 50 ml. of DMF were added. After a further half hour another 80 ml. of DMF were added. A temperature of 50° C. was maintained during the reaction. Stirring was continued for a final 6 hours at 50° C.

Sheets were cast from this solution as described above and treated and tested to obtain the curve shown at 1 in FIG. 2. To further samples of the solution various additives were added in dimethylformamide solution or dispersion to obtain curves 2, 3 and 4. Thus curve 2 was obtained by adding stannous octoate in a concentration of 1% by weight based upon the weight of the polymer, curve 3 was obtained by adding the disodium salt of EDTA at the same concentration, curve 4 was obtained by adding both 1% of the disodium salt of EDTA based upon the weight of the polymer and also 1% calculated similarly of stannous octoate.

The results shown in FIG. 2 demonstrate clearly that whatever the additive used, the rate of degradation in a thin film of the kind used is considerably increased when the results are compared directly with the freshly synthesized and absolutely pure product. When there is residual stannous octoate, the rate of hydrolytic degradation is very sharply increased. When however, EDTA is added in addition to stannous octoate, the results are very much improved and at the upper end of the curve e.g. at the broken line showing 75% degradation, an improvement factor of between 2 and 5 is obtained. At the upper end of the scale the rate of degradation is much the same for EDTA alone and EDTA plus stannous octoate, the differences between these two curves being only apparent at the lower end of the graph where degradation is almost complete. Some caution should be used in comparing the results of FIGS. 1 and 2 directly since in the latter the ordinate is plotted on a logarithmic scale.

EXAMPLE 12

This experiment demonstrates a probable synergistic effect through the use of EDTA and a carbodiimide stabilizer. The polyurethane was of similar type to that of Example 11 but was of inherently higher tensile strength. The normal condensation technique of Example 11 was used in making the polyester resin which was based on one for butane diol and adipic acid. The polyester was a hard solid with a melting point between 50 and 60° C., of similar molecular weight but with an acid value of below 4 and a hydroxyl number of 60. To prepare the polyurethane the resin was first melted and a weighed amount of molten MDI added. This prepolymer reaction lasted for 15 minutes at a temperature of 85° C. before the diol and DMF were finally added to the mixture whereupon the temperature dropped to 45° C. The total reaction time at 45° C. was 3 hours with stirring. Films were cast and additives added as described in Example 11. The results are shown in the form of a graph in FIG. 3 where the ordinate is tensile energy ratio plotted linearly against degradation time for treatment in the autoclave at 120° C.

Curve 1 shows the results obtained with the untreated and supposedly pure polymer. Curve 2 shows the result obtained when an amount of 2% by weight based upon the weight of polymer of a carbodiimide (registered trademark Stabaxol) was added. Curve 3 was obtained after adding 2% of Stabaxol as above and 100 parts per million of stannic chloride ($SNCl_2$) and also 1% of the disodium salt of EDTA.

Unfortunately the results are insufficient for a full analysis but it appears that in the case of this polymer, the effect of addition of both types of stabilizer is to increase the stability to hydrolytic degradation rather than to decrease it as in Example 11. This can again be said to show that the result obtainable with a pure polymer is difficult to predict and may vary with the strength of the polymer and its initial resistance to degradation. The addition of carbodiimide alone demonstrates that the full effect and benefit of this compound is not obtained until fairly serious degradation has already taken place when further autocatalytic degradation is hampered. When EDTA and carbodiimide are added together, a remarkable stability is achieved in the upper part of the graph not withstanding the presence of a significant amount of a tin compound. Thus a remarkable increase in stability is obtained over the full life of the product and this is most marked in the important period before the product has degraded to 75% of its initial tensile energy ratio.

Further results have indicated that particularly in the case of thin films where the addition of the stabilizer in the form of solid particles may decrease inherently the tensile strength or tensile energy ratio, this effect can be minimized by the incorporation of the stabilizer in very small particles. Preferably the particle size should not exceed 10 microns diameter.

EXAMPLE 13

This example was used to test the possible benefit of a new way of incorporating the stabilizer into the polymer. This latter treatment involved digesting a pigment to be incorporated into the polymer in a 5% solution of the disodium salt of EDTA at 60° C. for 1 hour and then filtering it and washing it in a further ½% solution of the disodium salt. The pigment was then drained and dried and dispersed in DMF and added to a polymer solution in DMF in an amount of 2% by weight based on the weight of polymer. After degradation at 100° C. the product showed more stability to hydrolytic degradation than a similar product in which 2% of the disodium salt of EDTA and 2% of the pigment (untreated) were added based upon the weight of polymer. The polymer used was a commercial straw colored syrup produced by dissolving a polyester urethane of about 2000 molecular weight in DMF to obtain a 30% solution.

Up to 10% or more of the treated pigment (depending upon type and quality) may be added.

While in the above description a great deal of emphasis has been laid upon the application of the invention in shoe manufacturing and in particular with shoe uppers, the invention is by no means restricted to such products. For example the invention is of particular importance in the manufacture of shoe soles particularly of moulded polyurethane. The invention is also very useful in connection with garments, for example polyurethane coated fabrics and to the use in such fabrics and other forms of plastic sheet composed of polymeric condensates used in garments and upholstery for example in motor car seats. Motor car seats and for example mackintoshes are highly subject to hydrolytic deterioration which is generated by sweat. For example the portions of coats under the armpits and other such areas tend to degrade very quickly. Another important application is in the manufacture of bellows for various machines such as cameras and firearms which are subjected to hard use under exposed conditions. The invention is also suitable for use in the preparation of adhesives based upon polyurethane or other polymeric condensates.

Oxazolidone derivatives may be added similarly to carbodiimides, which may be polymeric carbodiimides, in combination with the stabilizers of the invention.

In addition to or instead of EDTA, other similar amino acid chelates can be used e.g. alkyl diamine polycarboxylic acids preferably containing 4 carboxylic acid groups, or any alkali metal salts thereof.

What I claim is:

1. An article partly or wholly comprised of a polymeric condensate composition normally susceptible to hydrolytic attack, but having resistance to hydrolytic degradation, comprising a polymeric condensate which is a polyurethane and said polymeric condensate composition comprising at least ½% by weight based on the weight of the polyurethane polymer of a stabilizer against hydrolytic degradation selected from the group consisting of ethylene glycol bis(2-aminoethyl) tetraacetic acid, diaminoethane - $N,N^1$ - di-(o-hydroxyphenylacetic acid), 1,2-diaminocyclohexane tetraacetic acid iminodiacetic acid, phthalic acid, potassium hydrogen phthalate, potassium hydrogen tartrate and sodium hydrogen succinate.

2. An article in accordance with claim 1 containing said stabilizer in an amount from ½ to 2% based on the weight of the polyurethane polymer.

3. A polymeric condensate composition normally susceptible to hydrolytic attack, but having resistance to hydrolytic degradation, comprosing a polymeric condensate which is a polyurethane, said polymeric condensate composition comprising at least ½% by weight based on the weight of the polyurethane of a stabilizer against hydrolytic degradation selected from the group consisting of ethylene glycol bis(2-aminoethyl) tetraacetic acid, diaminoethane, $N,N^1$-di-(o - hydroxyphenylacetic acid), 1,2 - diaminocyclohexanetetraacetic acid, iminodiacetic acid, phthalic acid, potassium hydrogen phthalate, potassium hydrogen tartrate and sodium hydrogen succinate.

4. A polymeric condensate composition normally susceptible to hydrolytic attack, but having resistance to hydrolytic degradation, comprosing a polymeric condensate which is a polyurethane, said polymeric condensate composition comprising ½% to 2% by weight based on the weight of polyurethane polymer of a stabilizer against hydrolytic degradation selected from the group consisting of ethylene glycol bis(2-aminoethyl) tetraacetic acid, diaminoethane $N,N^1$-di-(o-hydroxyphenylacetic acid), 1,2-diaminocyclohexanetetraacetic acid, iminodiacetic acid, benzoic acid, phthalic acid, adipic acid, potassium hydrogen phthalate, potassium hydrogen tartrate and sodium hydrogen succinate.

5. A polymeric condensate composition normally susceptible to hydrolytic attack, but having resistance to hydrolytic degradation, comprosing a polymeric condensate which is a polyurethane polymer, said polymeric condensate composition comprising at least ½% by weight based on the weight of the polyurethane polymer of a stabilizer combination against hydrolytic degradation selected from the group consisting of chelating agents selected from the group consisting of alkyl diamine polycarboxylic acids or water-soluble salts thereof, ethylene glycol bis(2-aminoethyl)-tetraacetic acid, and thiourea, a weak free organic acid selected from the group consisting of benzoic acid, phthalic acid and adipic acid or a buffer selected from the group consisting of potassium hydrogen phthalate, potassium hydrogen tartrate and sodium hydrogen succinate in combination with a carbodiimide, in an amount from 0.1 to 2% by weight based on the weight of the polyurethane polymer.

6. The polymeric condensate composition as defined in claim 5 wherein said chelating agent comprises diaminoethane $N,N^1$-di-(o-hydroxyphenylacetic acid).

7. An article partly or wholly comprised of the polymeric condensate composition as defined in claim 5.

8. An article in accordance with claim 7 wherein the stabilizer combination comprises ethylene diamine tetraacetic acid or water-soluble salt thereof and a carbodiimide.

9. An article in accordance with claim 7, wherein the carbodiimide is a polymeric carbodiimide.

10. An article in accordance with claim 7, wherein the article is selected from the group consisting of a shoe upper, a shoe sole, garments, upholstery and bellows.

11. An article in accordance with claim 7, wherein the polymeric condensate contains inorganic metal cations.

12. An article in accordance with claim 11, wherein the metal cations are stannic cations.

13. An article in accordance with claim 7, wherein the stabilizer combination is occluded with or coated upon particles of pigment.

14. An article in accordance with claim 11, wherein the stabilizer is in the form of particles of not more than 10 microns diameter.

15. An article in accordance with claim 14, wherein the stabilizer is ethylene diamine tetraacetic acid or a water soluble salt thereof and the polymeric condensate is a thin layer of polyurethane.

16. An article partly or wholly comprised of a polymeric condensate composition normally susceptible to hydrolytic attack, but having resistance to hydrolytic degradation, comprising a polymeric condensate which is a polyurethane and said polymeric condensate composition comprising from ½ to 2% by weight based on the weight of the polyurethane polymer of a stabilizer against hydrolytic degradation selected from the group consisting of benzoic acid and adipic acid.

17. An article subject to hydrolytic deterioration which is generated by sweat, bu having resistance to such hydrolytic deterioration, said article being selected from the group consisting of shoes and formed components thereof, garments, upholstery and bellows, said article being partly or wholly comprised of a polyurethane, the resistance to hydrolytic deterioration of said article being increased by incorporating in said polyurethane at least ½% by weight of the polyurethane of ethylene diamine tetraacetic acid or a water-soluble salt thereof.

References Cited

UNITED STATES PATENTS

| | | | |
|---|---|---|---|
| 3,284,404 | 11/1966 | Schollenberger | 260—45.85 |
| 3,365,420 | 1/1968 | Clark et al. | 260—45.7 |
| 3,298,995 | 1/1967 | Bloor et al. | 260—45.85 |
| 3,193,525 | 7/1965 | Kallert et al. | 260—45.9 |
| 3,193,522 | 7/1965 | Neumann et al. | 260—45.9 |
| 3,446,771 | 5/1969 | Matsubayashi et al. | 260—45.85 |
| 3,124,543 | 3/1964 | Fowler et al. | 260—2.5 |
| 3,257,754 | 6/1966 | Ohsol | 260—2.5 |
| 3,637,542 | 1/1972 | Doerge et al. | 260—2.5 |

OTHER REFERENCES

Chemical Abstracts, vol. 65, section 13950f (1966).

High Temperature Resistance and Thermal Degradation of Polymer, Monograph #13, Society of Chemical Industry, London (1961), pp. 43–59.

Article by Eirich et al., U.S. Sci. Lib. #TP 156, p. 6S57 (1960).

DONALD E. CZAJA, Primary Examiner

V. P. HOKE, Assistant Examiner

U.S. Cl. X.R.

260—2.5 BB, 45.9 NC, 45.85 T, 45.85 N